United States Patent
Hart et al.

(10) Patent No.: US 8,479,847 B2
(45) Date of Patent: Jul. 9, 2013

(54) BREAKAWAY CLUTCH FOR CONTROLLABLE SPEED ACCESSORY DRIVE SYSTEM

(75) Inventors: James M. Hart, Belleville, MI (US); Clinton E. Carey, Monroe, MI (US); James B. Borgerson, Ann Arbor, MI (US); Kenneth Clair Hauser, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1393 days.

(21) Appl. No.: 11/876,812

(22) Filed: Oct. 23, 2007

(65) Prior Publication Data
US 2009/0101465 A1    Apr. 23, 2009

(51) Int. Cl.
*B60K 6/38* (2007.10)

(52) U.S. Cl.
USPC .................................. 180/65.21; 180/65.265

(58) Field of Classification Search
USPC .............. 180/65.21, 65.265, 65.275, 65.28, 180/65.285, 65.235
See application file for complete search history.

(56) References Cited

U.S. PATENT DOCUMENTS

| | | | | |
|---|---|---|---|---|
| 5,558,173 A * | 9/1996 | Sherman | ............. | 180/53.8 |
| 5,669,842 A * | 9/1997 | Schmidt | ............. | 475/5 |
| 5,896,750 A * | 4/1999 | Karl | ............. | 62/236 |
| 6,019,183 A * | 2/2000 | Shimasaki et al. | ............. | 180/165 |
| 6,251,042 B1 * | 6/2001 | Peterson et al. | ............. | 477/3 |
| 6,490,511 B1 * | 12/2002 | Raftari et al. | ............. | 701/22 |
| 6,554,113 B2 * | 4/2003 | Li et al. | ............. | 192/48.92 |
| 6,793,059 B2 * | 9/2004 | Okada et al. | ............. | 192/84.1 |
| 6,863,139 B2 * | 3/2005 | Egami et al. | ............. | 180/53.8 |
| 7,282,003 B2 * | 10/2007 | Klemen et al. | ............. | 475/5 |
| 7,582,034 B2 * | 9/2009 | Usoro | ............. | 475/5 |
| 7,631,719 B2 * | 12/2009 | Wenthen | ............. | 180/243 |
| 7,748,483 B2 * | 7/2010 | Usoro | ............. | 180/65.27 |
| 7,753,147 B2 * | 7/2010 | Usoro | ............. | 180/53.8 |
| 2002/0059019 A1 * | 5/2002 | Nakao et al. | ............. | 701/22 |
| 2008/0280726 A1 * | 11/2008 | Holmes et al. | ............. | 477/5 |
| 2009/0314559 A1 * | 12/2009 | Palitto | ............. | 180/65.22 |

* cited by examiner

*Primary Examiner* — Katy M Ebner
(74) *Attorney, Agent, or Firm* — Quinn Law Group, PLLC

(57) ABSTRACT

An accessory drive system for a hybrid vehicle is provided including a planetary gear set having first, second, and third members. A torque transfer device operatively connects an engine with the first member. A motor/generator is operatively connected to the second member. A plurality of vehicle accessories are operatively connected to the third member. A one-way clutch is operatively connected to either the first member of the planetary gear set or the torque transfer device. The one-way clutch is also selectively connected to a stationary member via a breakaway clutch configured to slip when either the input torque exceeds a threshold value or the direction of rotation is opposite of the driving direction. Engine output is transferable through the planetary gear set to drive the accessories at a selectable rate, and the motor/generator is controllable to run the accessories while the engine is off and while restarting the engine.

20 Claims, 2 Drawing Sheets

BREAKAWAY CLUTCH FOR CONTROLLABLE SPEED ACCESSORY DRIVE SYSTEM

TECHNICAL FIELD

The present invention pertains generally to controllable speed accessory drive systems for motorized vehicles.

BACKGROUND OF THE INVENTION

In conventional motor vehicles, i.e., automobiles propelled solely by an internal combustion engine, vehicle accessories such as hydraulic pumps, water pumps, vacuum pumps, and heating, ventilation, and air conditioning (HVAC) compressors are powered directly from the internal combustion engine. The power requirements of these accessories may be steady over extended periods of time, as in the case of water pumps used to help cool the engine, or may be required in short bursts, as in the case of hydraulic accessories or air brakes. Regardless, accessory speed is typically proportional to engine speed despite the varying power demand of the accessories.

Conventional automotive accessory drive systems include a drive pulley connected to the engine's crankshaft. A flexible chain or belt couples the drive pulley with a plurality of driven pulleys that are each operatively connected to an individual accessory. In hybrid vehicles which employ an internal combustion engine with one or more electric motors for propulsion, either in series or in parallel, these same accessories (e.g., an electrically-driven A/C compressor or an electrically-driven vacuum pump for a brake booster) are often powered from the internal combustion engine in much the same manner as in conventional motor vehicles.

Since the drive pulley and belt are actuated directly by the crankshaft, they are necessarily subject to engine speed variations during vehicle acceleration and deceleration. In other words, the operating speeds of the accessories in such conventional drive systems are directly proportional to the speed of the engine. Since the engine operates over a wide speed range (e.g., from as low as 500 rpm at idle to as high as 8,000 rpm at full capacity) the accessories are typically designed to be fully functional at the low end of the engine speed range in order to ensure that they can remain operational. Consequently, when the engine is operating at higher speeds, conventional accessory drive systems may transfer more energy to the accessories than necessary to provide adequate function.

The above discussed matter is further complicated for hybrid vehicles with an engine stop-start feature because, under certain operating conditions the engine is shut down to save fuel, yet the accessories need to remain operational. Further, for a belt-alternator-starter type hybrid, it is desirable to be able to start the engine with the alternator-starter without impacting the operation of the accessories.

SUMMARY OF THE INVENTION

Provided herein is a controllable speed accessory drive system for a motor driven vehicle, preferably of the hybrid type. The controllable speed accessory drive system described below reduces parasitic energy consumption, thereby enhancing fuel economy, and also provides for improved system durability and reduced noise.

The accessory drive system includes an engine, one or more vehicle accessories, a gear train, a motor/generator, a first selectively engageable torque transmitting device, and a breakaway clutch. The gear train operatively connects the engine to the vehicle accessories to permit the engine to drive the accessories. The motor/generator is connected to the gear train in order to drive the various vehicle accessories at a selectable rate that is independent of the engine speed. The motor/generator is also configured to re-start the engine while simultaneously powering the various vehicle accessories.

The first selectively engageable torque transmitting device, which is preferably either a one-way clutch or brake, is operatively connected between a stationary member and the gear train such that it can provide the reaction torque necessary to allow the accessories to be driven by the motor/generator when the engine is off. A breakaway clutch is operatively engaged with and configured to ground the first selectively engageable torque transmitting device below a predetermined torque (or torque capacity), and to slip or disengage at or above the predetermined torque, thereby breaking the connection of the first selectively engageable torque transmitting device with the stationary member.

The breakaway clutch is disposed in series torque transmitting relation with the first torque transmitting device in order to disengage first torque transmitting device from the stationary member. Preferably, the torque capacity of the breakaway clutch is greater than a grounding torque required to allow the various accessories to operate at maximum capacity, yet less than a predetermined spike load, above which damage would result to the accessory drive system. Ideally, the breakaway clutch includes one or more friction plates individually interposed between an apply plate and one or more reaction plates. A biasing member, preferably of the Belleville-spring type, is operatively connected to the apply plate and configured to apply a predetermined load thereto.

The accessory drive system will preferably include a controller or electronic control unit (ECU) operatively connected to the engine and motor/generator. The controller is configured to control the speed of the motor/generator in order to optimize the speed at which the accessories are run, thereby further reducing parasitic energy consumption.

Optimally, the controllable speed accessory drive system includes a plurality of torque transfer apparatuses that are disposed between the engine and the various vehicle accessories and configured to transfer power therebetween. The torque transfer apparatus may include a plurality of pulleys connected by a belt member. Alternatively, the torque transfer apparatus may include a plurality of sprockets connected by a chain member.

The gear train is preferably a planetary gear set having first, second, and third members. Ideally, the engine is connected to the first member of the planetary gear set, while the motor/generator is operatively connected to the second member and the accessories are operatively connected to the third member.

According to the preferred embodiment of the present invention, the first member of the planetary gear set is a planet carrier assembly, the second member is a sun gear member, while the third member is a ring gear member.

According to an alternate embodiment, the first member of the planetary gear set is the planet carrier assembly, the second member is the ring gear member, while the third member is the sun gear member.

It is preferred that the accessory drive system also include a second selectively engageable torque transmitting device. In the preferred embodiment, the second torque transmitting device is a selectively engageable one-way clutch operatively connected to the gear train, namely the ring gear and planet carrier assembly. The second torque transmitting device is configured to enable the engine to power the accessories directly without power input from the motor/generator.

The above features and advantages, and other features and advantages of the present invention will be readily apparent from the following detailed description of the preferred embodiments and best modes for carrying out the invention when taken in connection with the accompanying drawings.

DESCRIPTION OF THE PREFERRED EMBODIMENTS

Figure 1:
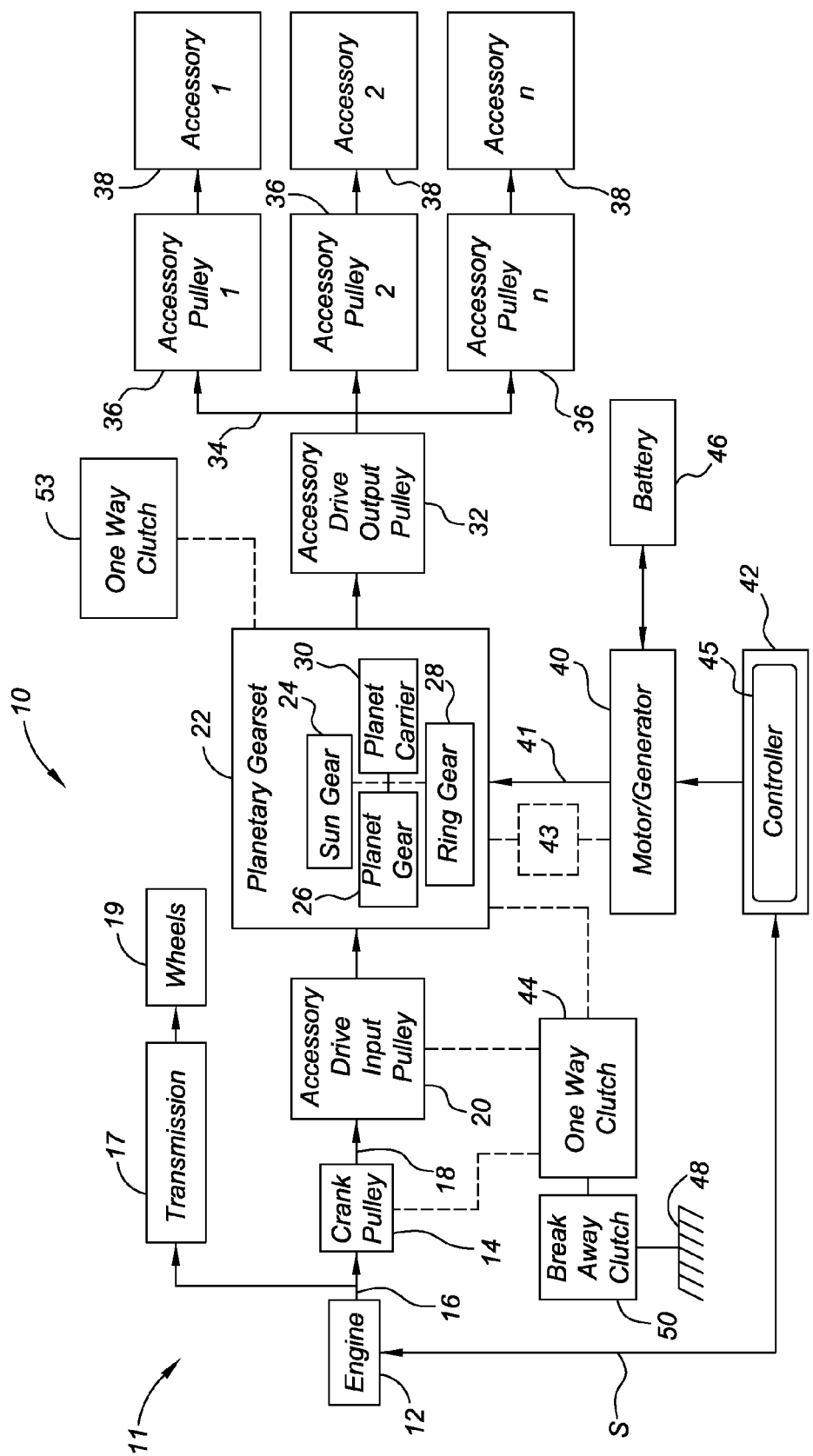
FIG. 1 is a schematic illustration depicting a controllable speed accessory drive system for a hybrid vehicle in accordance with the present invention.

Referring to the figures, wherein like reference numbers refer to like or similar components throughout the several views, FIG. 1 is a schematic representation of a controllable speed accessory drive system, shown generally at 10, for a motorized vehicle. The accessory drive system 10 is preferably incorporated into a series hybrid vehicle, identified generally as 11 in FIG. 1, but can also be incorporated into other types of vehicles (e.g., conventional internal combustion engine automobiles, electric vehicles, etc.) across various platforms (e.g., passenger car, light truck, heavy duty, and the like.) The types of vehicle accessories that may be driven using the accessory drive system 10 of the present invention include compressors, such as brake air compressors or air conditioning compressors, hydraulic pumps, such as those used for power steering or other heavy duty hydraulic equipment, water pumps, and vacuum pumps (for instance, to operate a brake booster.)

The accessory drive system 10 includes an engine 12 configured to transmit power (e.g., by way of torque) to a crank pulley 14 via an engine output shaft, such as crankshaft 16. A first belt 18 couples the crank pulley 14 with an accessory drive input pulley 20. The accessory drive input pulley 20 is operatively connected to a differential gear system, also referred to in the art as a gear train, preferably in the nature of a planetary gear set 22.

The planetary gear set 22 employs an outer gear member, typically designated as the ring gear 28. The ring gear member 28 circumscribes an inner gear member, typically designated as the sun gear 24. A carrier member, such as planet carrier assembly 30, rotatably supports a plurality of planet gears 26 such that each of the planet gears 26 meshingly engages both the outer, ring gear member 28 and the inner, sun gear member 24 of the planetary gear set 22. It should be understood that the planet carrier assembly 30 may be of the single- or the double-pinion carrier type, without departing from the intended scope of the present invention.

The planetary gear set 22 is configured to convert the rotational speed of the accessory drive input pulley 20, which runs at a fixed ratio of engine speed, to a predetermined value selected to efficiently drive a plurality of vehicle accessories 38. In other words, the planetary gear set 22 selectively increases or decreases the magnitude of torque transmitted from the accessory drive input pulley 20 to the accessories 38 to more closely coincide with the actual power requirements of the accessories 38, thereby minimizing parasitic energy losses over traditional accessory drive systems.

Power from the planetary gear set 22 (e.g., torque) is transferred to an accessory drive output pulley 32. A second belt 34 couples the accessory drive output pulley 32 with one or more accessory pulleys 36. The accessory pulleys 36 are each operatively connected to respective one of a plurality of accessories 38. Notably, the various input and output pulleys and corresponding belts described herein can be replaced by connecting shafts, belt and sprocket assemblies, or intermeshing gears without departing from the scope of the present invention.

The engine 12 also transfers torque via the crankshaft 16 to a transmission 17. The transmission 17 transfers output from the engine 12 to a final drive system, represented herein by a plurality of wheels 19, in order to propel the hybrid vehicle 11.

In the embodiment depicted, the engine 12 may be a fossil fuel engine, such as a 3- or 4-stroke gasoline or diesel engine, which is readily adapted to provide its available power output typically delivered at a constant number of revolutions per minute (RPM). It should also be appreciated that the transmission 17 and wheels 19 may include any known configuration, e.g., front wheel drive (FWD), rear wheel drive (RWD), four-wheel drive (4WD), or all wheel drive (AWD). Thus, the accessory drive system 10 of the present invention is not intended to be restricted to the exemplary vehicle configuration set forth in FIG. 1.

Still referring to FIG. 1, the accessory drive system 10 also includes a motor/generator 40. The motor/generator 40 is configured to selectively operate as a motor, a generator, or it can be turned off to reduce rotational resistance. For instance, the motor/generator 40 is configured to selectively transfer torque to and/or receive torque from the planetary gear set 22, either directly, e.g., via shaft 41, or through an off-set drive such as, for example, a belt, chain, gear set, another differential gear set, or combinations thereof (all represented generally in phantom at 43 in FIG. 1.) The motor/generator 40 is also configured to receive power from and/or transfer power to a storage device, such as a battery 46. Alternatively, the storage device can be a fuel cell, capacitor, fly wheel, and the like.

The motor/generator 40 is controllable to drive the accessories 38 at a predetermined rate regardless of engine speed. By transferring a first predetermined amount of input torque from the engine 12 to one of the members of the planetary gear set 22, and transferring a second predetermined amount of input torque from the motor/generator 40 to another one of the members of the planetary gear set 22, the planetary gear set 22 can be controlled to produce a selectable amount of output torque from yet another of its members. Therefore, by controlling the status of the motor/generator 40 (i.e., either "motor", "generator", or "off"), and by controlling the amount of torque transferred from the motor/generator 40 to the planetary gear set 22, the planetary gear set 22 output speed is selectable within an operational range. Significant vehicle fuel economy gains are realized when the speeds of the accessories 38 are controlled to be independent of the engine speed.

The accessory drive system 10 also includes a controller, depicted in FIG. 1 in an exemplary embodiment as a microprocessor based electronic control unit (ECU) 42, having programmable memory 45. The engine 12 and the motor/generator 40 are operatively connected to the controller 42 (e.g., via electric cables, radio frequency or other wireless technology, or by electro-mechanical communication.) The controller 42 is configured or programmed to control the operation of the engine 12 and motor/generator 40. For instance, the controller 42 is programmed or configured to receive input, such as sensor signals S, from the engine 12 indicating the current engine speed. The controller 42 in turn determines or calculates a corresponding motor/generator 40 speed or torque value required to produce a predetermined planetary gear set 22 output speed. As an example, if the engine 12 is running at 4,000 rpm and the accessories 38 are optimized to run at 1,500 rpm, the controller 42 calculates the speed of the motor/generator 40 required to produce a planetary gear set 22 output speed of 1,500 rpm based upon the ring/sun tooth ratios of the planetary gear set 22. After completing the calculation, the controller 42 commands the motor/generator 40 to transfer the required amount of torque to the planetary gear set 22 such that the accessories 38 are driven in an optimally efficient manner.

The motor/generator 40 is also controllable to drive the accessories 38 when the engine 12 is in an off state—the accessories 38 remain fully operational even when the hybrid vehicle 11 is being powered exclusively by an alternate power source (e.g., motor/generator 40) in order to conserve fuel. Advantageously, the motor/generator 40 is also configured to re-start the engine 12 and power the accessories 38 when the engine 12 is being re-started such that there is no interruption of accessory 38 operation. More precisely, by controlling the motor/generator 40, output therefrom is transferable through the planetary gear set 22 to the accessories 38 such that the accessories 38 remain powered, and to the engine 12 such that the engine 12 is driven. As the engine 12 is being driven by the motor/generator 40, the controller 42 can introduce an engine spark (not shown) to re-start the engine 12.

A clutch is operatively connected between a stationary member 48, such as the motor/generator housing, a chassis frame, or the vehicle body, and either the crank pulley 14, the accessory drive input pulley 20, or a member of the planetary gear set 22. According to a preferred embodiment of the present invention, the clutch is an over-running one-way clutch 44. It should be appreciated, however, that over-running one-way clutches are merely a preferred embodiment and that alternate clutch configurations may be implemented for the clutch as well. For example, according to an alternate embodiment, the one-way clutch 44 may be replaced with a selectively engageable brake (not shown.)

The one-way clutch 44 is implemented to allow the planetary gear set 22, preferably planet carrier assembly 30, to rotate at a predetermined ratio of engine speed during engine-on operation, and to allow the motor/generator 40 to efficiently power the accessories 38 when the engine 12 is off. It should be appreciated that without the one-way clutch 44, the motor/generator 40 could transfer at least a portion of its output torque back to the engine 12 when the engine 12 is off, and that the torque transferred back to the engine 12 could cause the engine to rotate backwards. Therefore, the one-way clutch 44 prevents the transfer of torque from the motor/generator 40 back to the engine 12, and provides the reaction torque necessary to enable the motor/generator 40 to efficiently run the accessories 38.

Figure 2:
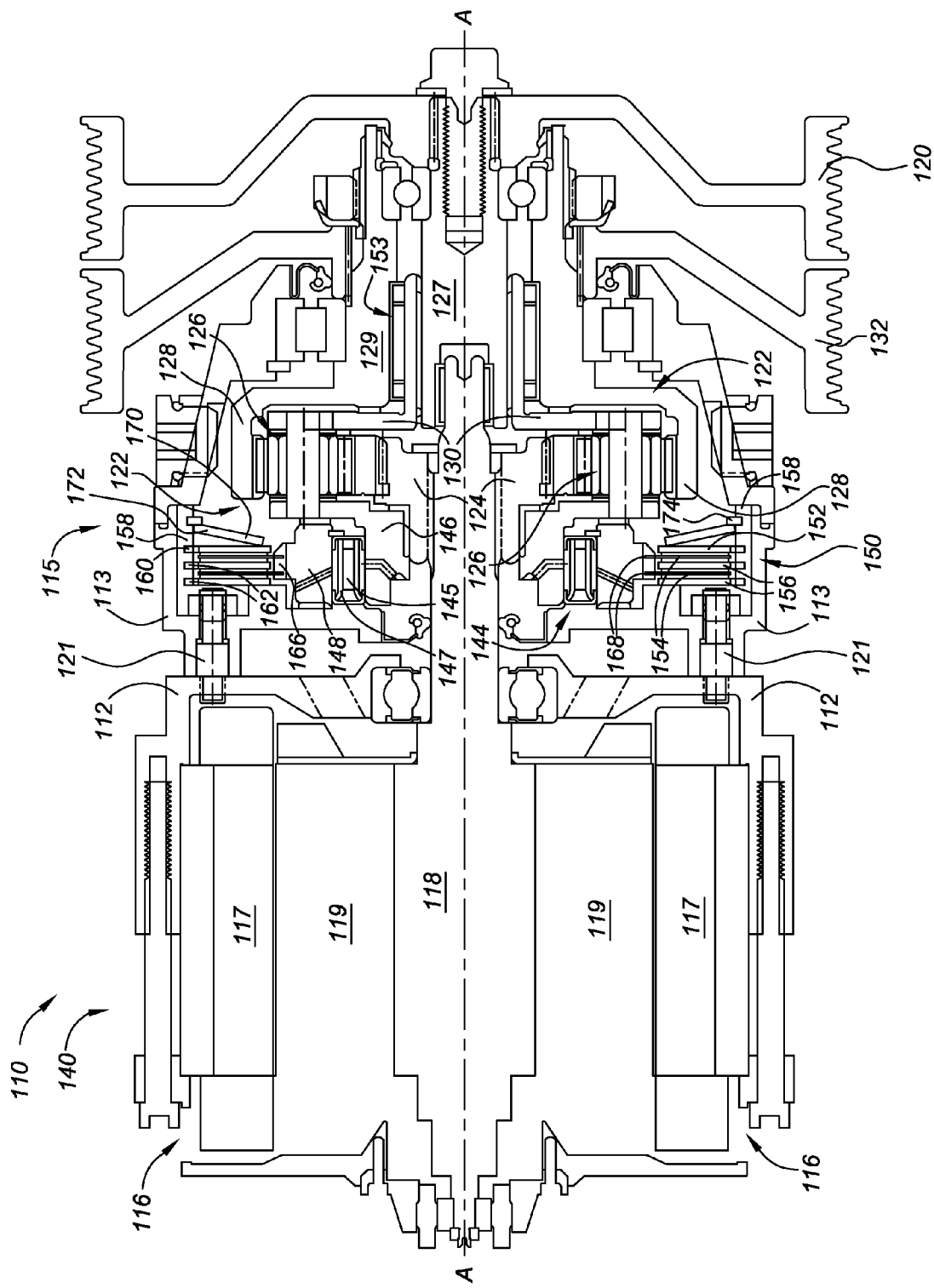
FIG. 2 is a schematic, cross-sectional view of a controllable speed accessory drive system in accordance with a preferred embodiment of the present invention.

Still referring to FIG. 1, a breakaway clutch 50 is disposed between the one-way clutch 44 and the stationary member 48. Ideally, the breakaway clutch 50 is positioned in series torque transmitting relation to the one-way clutch 44 (as best seen in FIG. 2). There may be circumstances in which the engine crankshaft 16 rotates in a direction opposite of the normal operational direction of rotation—e.g., during an engine shut-down operation. In addition, there may be circumstances during transient operating conditions in which there is a sudden increase in torque input to the accessory drive system 10, also referred to in the art as a "load spike". The addition of the breakaway clutch 50 in series torque transmitting relation with the one-way clutch 44 mitigates the potentially adverse affects of these two scenarios—the breakaway clutch 50 being configured to act as a "fuse" or "filter" by disengaging the one-way clutch 44 from the stationary member 48, as will be described in detail hereinbelow.

An optional torque transmitting mechanism, preferably one-way clutch 53 (depicted in phantom in FIG. 1) is disposed between two members of the planetary gear set 22. The one-way clutch 53 is intended to enable the engine 12 to operate the accessories 38 at higher speeds without the need for the motor/generator 40 to generate electric power, thus reducing the torque and power capacity requirement of the motor-generator 40 (i.e., allowing for a smaller, lighter, less expensive motor/generator assembly.) More specifically, the optional, one-way clutch 53 provides the means for causing the planetary gear set 22 to operate as a unit—all three members operating at the same rotational speed. In so doing, the accessory drive input pulley 20, and thus engine 12, is connected directly to the accessory drive output pulley 32, thereby allowing the engine 12 to drive the accessories 38 directly without power from the motor/generator 40.

Referring now to FIG. 2, a schematic, cross-sectional view of an accessory drive system, identified generally as 110, in accordance with a preferred embodiment of the present invention is provided. The accessory drive system 110 includes a first housing portion 112 that is preferably mounted to an engine (e.g., engine 12 of FIG. 1) and a torque transmission assembly 115, similar to the arrangement of FIG. 1. The first housing portion 112 encompasses a motor/generator assembly, indicated generally as 140. The motor/generator assembly 140, preferably of the alternating current (AC) type that includes a motor/generator 116 having a stator 117 circumscribing an annular rotor 119, operatively drives a motor/generator shaft 118.

The first housing portion 112 is operatively attached, e.g., via bolts 121, to a second housing portion 113. The second housing portion 113 encases a differential gear set, preferably in the nature of planetary gear set 122. Similar to the planetary gear set 22 or FIG. 1, the planetary gear set 122 of FIG. 2 employs an outer gear member, typically designated as the ring gear 128. The ring gear member 128 circumscribes an inner gear member, typically designated as the sun gear 124. A carrier member, such as planet carrier assembly 130, rotatably supports a plurality of planet gears 126 such that each of the planet gears 126 meshingly engages both the outer, ring gear member 128 and the inner, sun gear member 124 of the planetary gear set 122. It should be understood that the planet carrier assembly 130 may be of the single-pinion type (as shown in FIG. 1) or the double-pinion type (not shown.)

Power output from the planetary gear set 122 is transferred to an accessory drive output pulley 132 via ring gear shaft 129. A second belt (not shown) thereafter couples the accessory drive output pulley 132 with one or more accessory pulleys (not shown), which are each operatively connected to respective one of the vehicle accessories (not shown.) Synonymous with the torque transfer apparatuses of FIG. 1, the various input and output pulleys and corresponding belts of FIG. 2 can be replaced by a connecting shaft, a belt and sprocket assembly, or intermeshing gears without departing from the scope of the present invention.

According to the preferred embodiment of FIG. 2, the motor/generator assembly 140 is configured to selectively operate as either a motor or a generator, functioning as described with respect to the motor generator 40 of FIG. 1. For example, the planetary gear set 122 is configured to convert the rotational speed of an accessory drive input pulley 120, which runs at a fixed ratio of engine speed and is connected via shaft 127 with planet carrier assembly 130, to a predetermined value selected to efficiently drive a plurality of vehicle accessories, such as accessories 38 of FIG. 1. In other words, the magnitude of torque transmitted from the accessory drive input pulley 120 to an accessory drive output pulley 132 is selectively increased or decreased by the planetary gear set 122 to more closely coincide with the actual power requirements of the accessories, thereby minimizing parasitic power losses. Thus, the motor/generator assembly 140 is controllable to drive the various vehicle accessories attached thereto at a predetermined rate regardless of engine speed, synonymous with the motor/generator 40 of FIG. 1.

Still referring to FIG. 2, a first torque-transmitting mechanism is operatively connected to a member of the planetary gear set 122, namely planet carrier assembly 130, and the second housing portion 113 via a second torque-transmitting mechanism. According to the embodiment presented in FIG. 2, the first torque-transmitting mechanism is an over-running one-way clutch 144. However, the over-running one-way clutch 144 is merely a preferred embodiment, and substitute clutch configurations may be implemented as alternatives. For example, according to an alternate embodiment, the one-way clutch 144 may be replaced with a selectively engageable brake (not shown.)

The one-way clutch 144 has a plurality of one-way torque-transmitting members 145 disposed between an inner race 146 and an outer race 148, also referred to herein as the one-way clutch hub or housing. In the exemplary embodiment shown, the torque-transmitting members 145 are in the form of rollers, housed in a cage 147, which maintains their circumferential space between the inner race 146 and the outer race 148. The rollers 145 are configured to engage cam surfaces (not shown) on the inner and/or outer races 146, 148 when the inner race 146 rotates in a direction opposite of drive to thereby prevent relative rotation between the inner race 146 and the outer race 148 in that direction and freewheel in the direction of drive. In other words, assuming that the engine driven, accessory drive input pulley 120 rotates in the clockwise direction, the one-way clutch 144 will freewheel in the clockwise direction, and lock in the counterclockwise direction, thereby disallowing the carrier assembly 130 from rotating in the counterclockwise direction. The operation of one-way clutches is well understood by those skilled in the art. It should be understood that the torque-transmitting members 145 may take on other configurations to transmit torque from the planetary gear set 122 and the transmission housing 113, e.g., a rocker clutch, sprag, mechanical diode, etc. (not shown herein.)

The one-way clutch 144 is implemented to allow the planet carrier assembly 130 to rotate, preferably in the clockwise direction, at a predetermined ratio of the engine speed during engine-on operation, to freewheel in the counterclockwise direction, and to allow the motor/generator assembly 140 to efficiently power the vehicle accessories when the engine is off. Similar to the embodiment of FIG. 1, the one-way clutch 144 prevents the transfer of torque from the motor/generator assembly 140 back to the vehicle engine (e.g., engine 12, FIG. 1) and provides the reaction torque necessary to enable the motor/generator assembly 140 to efficiently run the vehicle accessories (e.g., accessories 38, FIG. 1.).

Referring again to FIG. 2, a second torque transmitting device, specifically one-way clutch 153, is mounted concentrically with the shaft 127, radially disposed between the ring gear shaft 129 and the planet carrier assembly 130. As is readily known by those having ordinary skill in the art, if two members of a simple planetary gear set rotate in the same direction and at the same speed, the third member of the gear set is forced to turn at the same speed and in the same direction. Most relevant to the embodiment of FIG. 2, if the ring gear 128 and planet carrier assembly 130 are forced to rotate in the same direction and at the same speed, e.g., by actuating the one-way clutch 153, the entire planetary gear set 122 is locked together to effect what is known as direct drive—the single-pinion carrier 130 rotates in unison with the sun and ring gears, 124, 128. In so doing, the accessory drive input pulley 120 is connected directly to the accessory drive output pulley 132, thereby allowing the engine to transmit power directly to the accessories without power input from the motor/generator 116.

A third torque-transmitting mechanism, specifically the breakaway clutch shown generally in FIG. 2 at 150, is disposed between the one-way clutch 144 and the second housing portion 113, acting as a stationary member. The breakaway clutch 150 is positioned in series torque transmitting relation with the one-way clutch 144. The breakaway clutch 150 includes a clutch pack, defined herein by a plurality of friction plates or linings 154 interposed between an apply plate 152 and a plurality of clutch reaction plates 156, as depicted in FIG. 2. The apply plate 152 and reaction plates 156 are operatively connected to the second housing portion 113 via a housing extension 158 through splines 160 and 162, respectively. The friction plates 154 are operatively connected with a spline connection 166 of the outer race 148 of the one-way clutch 144 through splines 168.

A biasing member, preferably in the nature of Belleville spring 170, is preferably co-axially disposed, e.g., along axis of rotation A, with respect to the clutch pack. The Belleville spring 170 has an outer portion 172, which is positioned within the second housing portion 113 by a snap ring 174. The Belleville spring 170 is pressed or abutted against the apply plate 152 to provide a constant load on the clutch pack—apply plate 152, friction plates 154, and clutch reaction plates 156—thereby frictionally engaging or connecting the clutch pack plates and, in so doing, grounding the one-way clutch housing 148 to the second housing portion housing 113. It should be recognized that the breakaway clutch 150 can be replaced with a breakaway band equipped with a spring servo (not shown) without departing from the intended scope of the present invention.

Ideally, the spring 170 is selectively preloaded (e.g., pre-compressed) to provide a predetermined torque capacity or threshold, after which the breakaway clutch 150 will begin to slip—i.e., friction plates 154 will begin to frictionally disengage from clutch reaction plates 156. It is in this regard that the breakaway clutch 150 acts as a "fuse" or "filter". Under circumstances wherein the engine crankshaft, and thus the input pulley 120, rotates in a direction opposite of the normal operational direction of rotation, e.g., causing the shaft 127 to rotate counterclockwise, the one-way clutch 144 could be damaged if it were grounded. The breakaway clutch 150 is configured to disengage the one-way clutch 144 from the second housing portion housing 113 when rotation of the shaft 127 in the counterclockwise direction causes reaction torque of the breakaway clutch 150, as fed through the one-way clutch 144, to exceed the predetermined torque capacity, thus allowing the one-way clutch 144 to operate as a grounding device only when the engine crankshaft comes to a complete stop.

In addition, there may be circumstances during transient operating conditions when the motor/generator assembly 140 is driving the vehicle accessories via the planet carrier assembly 130 and there is a sudden load spike. Sudden changes in accessory load can potentially cause belt slippage or component failure. The addition of the breakaway clutch 150 in series with the one-way clutch 144 acts as a load filter by allowing slippage when the input of load is greater than a predetermined threshold value, thereby restricting the torque spike from being applied to the accessory drive output pulley 132. In other words, the breakaway clutch 150 is optimally preloaded to provide a minimum torque carrying capacity sized to transmit the grounding torque required to transmit a maximum accessory load, while the maximum torque carrying capacity (or breakaway capacity) of the breakaway clutch 150 is sized to allow clutch slippage when subjected to a grounding torque which may result in belt slippage.

While the best modes for carrying out the present invention have been described in detail herein, those familiar with the art to which this invention pertains will recognize various alternative designs and embodiments for practicing the invention within the scope of the appended claims.

The invention claimed is:

1. A controllable speed accessory drive system for a motorized vehicle, comprising:
    an engine operable over a range of engine speeds;
    at least one accessory;
    a planetary gear set operatively connecting said engine and said at least one accessory to permit said at least one accessory to be driven by said engine;
    a motor/generator operatively connected to said planetary gear set and configured to drive said at least one accessory at a selectable rate, independent of engine speed, when said engine is operated over said range of engine speeds, and to re-start said engine while simultaneously powering said at least one accessory;
    a first selectively engageable torque transmitting device operatively connected to said planetary gear set and configured to allow said at least one accessory to be driven by said motor/generator when said engine is off; and
    a breakaway clutch operatively engaged with and configured to ground said selectively engageable torque transmitting device below a predetermined torque and to slip at or above said predetermined torque.

2. The accessory drive system of claim 1, wherein said breakaway clutch is disposed in series torque transmitting relation with said selectively engageable torque transmitting device.

3. The accessory drive system of claim 2, wherein said breakaway clutch includes at least one friction plate disposed between an apply plate and at least one reaction plate, and a biasing member operatively connected to said apply plate and configured to apply a predetermined load thereto.

4. The accessory drive system of claim 3, wherein said predetermined torque is greater than a grounding torque required to allow said at least one accessory to be powered at maximum capacity and less than a spike load above which damage would result to the accessory drive system.

5. The accessory drive system of claim 4, wherein said selectively engageable torque transmitting device is one of a one-way clutch and a brake.

6. The accessory drive system of claim 5, further comprising:
    a controller operatively connected to said engine and said motor/generator, said controller being configured to control the speed of said motor/generator in order to optimize the speed at which said at least one accessory is run.

7. The accessory drive system of claim 6, further comprising:
    a plurality of pulleys configured to transfer power from said engine to said at least one accessory.

8. The accessory drive system of claim 7, further comprising:
    a battery configured to transfer power to and receive power from said motor/generator.

9. The accessory drive system of claim 8, wherein said motor/generator is operatively connected to said planetary gear set via one of a shaft, a belt and pulley assembly, a chain and sprocket assembly, and a second planetary gear set.

10. The accessory drive system of claim 9, further comprising:
    a second selectively engageable torque transmitting device operatively connected to said planetary gear set, said second torque transmitting device configured to enable said engine to power said at least one accessory directly without power input from said motor/generator.

11. The accessory drive system of claim 1, further comprising a controller operatively connected to said engine and to said motor/generator, said controller being configured to:
    receive a signal from said engine, the signal indicative of the current engine speed;
    determine a motor/generator speed or torque required to produce a predetermined planetary gear set output speed, the determined motor/generator speed or torque being based on the current engine speed; and
    command the motor/generator to transfer said speed or torque to the planetary gear set such that the at least one accessory is driven at the selected rate.

12. The accessory drive system of claim 11, wherein the motor/generator is further configured to selectively assume an operational status selected from the group including motor, generator, and off; and wherein the controller is further configured to command the operational status of the motor/generator.

13. The accessory drive system of claim 11, wherein the planetary gear set includes a ring/sun tooth ratio; and
    wherein the determined motor/generator speed or torque is further based on the ring/sun tooth ratio of the planetary gear set.

14. An accessory drive system for a hybrid vehicle comprising:
    a gear train having first, second, and third members;
    an engine operatively connected to said first member, said engine being operable to drive said at least one accessory through said gear train, said engine being operable over a range of engine speeds;
    at least one accessory operatively connected to said third member;
    a motor/generator operatively connected to said second member and configured to drive said at least one accessory at a selectable rate, independent of engine speed, when said engine is operated over said range of engine speeds, and to re-start said engine while simultaneously powering said at least one accessory;
    a first selectively engageable torque transmitting device operatively connected to said gear train and configured to allow said at least one accessory to be driven by said motor/generator when said engine is off; and
    a breakaway clutch disposed in series torque transmitting relation with said first selectively engageable torque transmitting device and configured to ground said first selectively engageable torque transmitting device below a predetermined torque and to slip at or above said predetermined torque.

15. The accessory drive system of claim 14, wherein said predetermined torque is greater than a grounding torque required to allow said at least one accessory to be powered at maximum capacity and less than a spike load above which damage would result to the accessory drive system.

16. The accessory drive system of claim 15, wherein said breakaway clutch includes at least one friction plate disposed between an apply plate and at least one reaction plate, and a biasing member operatively connected to said apply plate and configured to apply a predetermined load thereto.

17. The accessory drive system of claim 16, wherein said first selectively engageable torque transmitting device is one of a one-way clutch and a brake.

18. The accessory drive system of claim 17, further comprising:
a second selectively engageable torque transmitting device operatively connected to at least two of said members of said gear train, said second torque transmitting device configured to enable said engine to power said at least one accessory directly without power input from said motor/generator.

19. The accessory drive system of claim 18, wherein said first member is a planet carrier member, said second member is one of a ring gear member and a sun gear member, and said third member is the other one of said ring gear member and said sun gear member.

20. A hybrid vehicle comprising:
an engine operable over a range of engine speeds;
a planetary gear set having a first, a second, and a third member,
at least one accessory operatively connected to said third member;
a torque transfer apparatus operatively connecting the engine with said first member to allow said engine to transfer power through said planetary gear set to drive the at least one accessory;
a motor/generator operatively connected to said second member and configured to drive said at least one accessory at a selectable rate, independent of engine speed, when said engine is operated over said range of engine speeds, and to re-start said engine while simultaneously powering said at least one accessory;
one of a brake and a one-way clutch operatively connected to one of said first member and said torque transfer apparatus, said brake or one-way clutch configured to allow the plurality of accessories to be driven by the motor/generator when the engine is off; and
a breakaway clutch disposed in series torque transmitting relation with said one of a brake and a one-way clutch and configured to ground said one of a brake and a one-way clutch below a predetermined torque and to slip at or above said predetermined torque; and
wherein said breakaway clutch includes at least one friction plate disposed between an apply plate and at least one reaction plate, and a biasing member operatively connected to said apply plate and configured to apply a predetermined load thereto.

* * * * *